US005361193A

United States Patent [19]

Nino

[11] Patent Number: 5,361,193

[45] Date of Patent: Nov. 1, 1994

[54] VEHICULAR HEADLIGHT REFLECTOR SUITABLE FOR USE WITH A DISCHARGE LAMP

[75] Inventor: Naohi Nino, Shizuoka, Japan

[73] Assignee: Koito Manufacturing Co., Ltd., Tokyo, Japan

[21] Appl. No.: 115,120

[22] Filed: Sep. 2, 1993

[30] Foreign Application Priority Data

Oct. 6, 1992 [JP] Japan .................................. 4-290907

[51] Int. Cl.[5] ........................... F21V 7/14; B60Q 1/04

[52] U.S. Cl. ...................................... 362/346; 362/61; 362/297; 362/347; 362/348

[58] Field of Search ................. 362/61, 297, 298, 348, 362/261, 346, 347

[56] References Cited

U.S. PATENT DOCUMENTS 4,760,501 7/1988 de Vrijer ............................ 362/261
5,008,781 4/1991 Nino ..................................... 362/61

FOREIGN PATENT DOCUMENTS 2253043 8/1992 United Kingdom ................ 362/346

*Primary Examiner*—Ira S. Lazarus
*Assistant Examiner*—Sara Sachie Raab
*Attorney, Agent, or Firm*—Sughrue, Mion, Zinn, Macpeak & Seas

[57] ABSTRACT

A reflecting surface consists of three reflecting sectors arranged around the optical axis. The first reflecting sector located above the horizontal plane including the optical axis is a part of a paraboloid of revolution having a focus at point F. The second reflecting sector consists of two sub-sectors located on the right and left sides of the vertical plane including the optical axis. A fundamental surface of the two sub-sectors has a reference parabola in a plane inclined from the horizontal plane by a predetermined angle, and is a collection of intersecting lines each obtained by cutting an imaginary paraboloid of revolution assumed for a point on an orthogonal projection of the reference parabola onto the horizontal plane by a vertical plane including an axis of the imaginary paraboloid of revolution. The third reflecting sector located below the horizontal plane is a part of a paraboloid of revolution having a focus at point G. An orthogonal projection of an arc of a discharge lamp is located between points F and G.

4 Claims, 8 Drawing Sheets

VEHICULAR HEADLIGHT REFLECTOR SUITABLE FOR USE WITH A DISCHARGE LAMP

BACKGROUND OF THE INVENTION

The present invention relates to a reflector for a vehicular headlight which uses a discharge lamp as a light source.

Recent trends of automobile design have prompted efforts to develop new types of headlights. That is, with a streamlined body shape to satisfy the requirements of high speed and high fuel efficiency, the front faces of automobiles tend to incline toward the horizontal plane, which necessitates outer lenses of headlights to incline similarly. As a result, the effective height of headlights tends to decrease. As another trend, small metal halide lamps have recently attacted much attention as light sources for such headlights.

FIG. 15 schematically shows a spatial relationship between a metal halide lamp a and a paraboloid-of-revolution reflector b. The metal halide lamp a is disposed so that the central axis of its glass tube c coincides with the optical axis L—L of the reflector a. An arc is generated between electrodes arranged in a sphere d (discharge space) located at the center of the glass tube c.

However, conventionally the shapes of reflector surfaces have been designed with an assumption that a coil-like filament is used; that is, they have been designed with no fundamental consideration of the structure of metal halide lamps. Therefore, the combination of such a reflector and a metal halide lamp is associated with a problem that glare appears conspicuously in a light distribution pattern.

FIG. 16 schematically shows upper edge portions f of images projected onto a front screen by reflecting sectors e (shown hatched in FIG. 15 for clarity) that occupy right and left areas of the reflecting surface of the reflector b of FIG. 15. The reflecting sectors e have predetermined central angles when viewed from the front side.

In FIG. 16, H—H and V—V denote horizontal and vertical lines, respectively. The images f are located under the horizontal line H—H with the vertical line V—V in between, and shaped like a bow which corresponds to the electric arc of the metal halide lamp a.

Glare appears conspicuously in areas g (hatched in FIG. 16) located over the images f and occupying both sides of the horizontal line H—H. The glare is caused by light emission by metal iodide substances accumulated in the sphere d of the metal halide lamp a.

FIG. 17 is an enlarged view of the sphere d of the metal halide lamp a. Electrode rods i are penetrated through pinch seal portions h that are connected to the sphere d on both sides. An arc j is generated between tip portions of the electrode rods i that are projected into the sphere d. The arc j has the maximum brightness at positions p, p that are close to the electrode rods i.

As shown in FIG. 17, there is an accumulation k of metal iodide substances on the bottom of the sphere d. The accumulation k is a cause of secondary light generated in response to the light of the arc j, and the glare in the light-distribution pattern is caused by the light from the accumulation k and a region hatched in FIG. 17.

Since the images f contribute to formation of the cutline (cutoff line) and the maximum contrast portion of the light distribution pattern, the shape of the reflecting sectors e is important for the reduction of the glare.

SUMMARY OF THE INVENTION

An object of the present invention is to provide a vehicular headlight reflector which can reduce glare that is caused when a discharge lamp is used as a light source.

In a vehicular headlight reflector according to the invention, a reflecting surface consists of three reflecting sectors, i.e., two paraboloid-of-revolution sectors and one sector having the following fundamental surface shape.

The fundamental surface, in a generalized form is defined by, a reference parabola in a plane inclined by a predetermined angle from a horizontal plane including the optical axis, and has a reference point on the optical axis (which passes through a vertex and a focus of the reference parabola) in front of that focus. The reflecting surface is formed as a collection of intersecting lines each obtained by cutting an imaginary paraboloid of revolution having an axis in parallel with a ray vector of a ray (assumed to be emitted from the reference point) reflected at a point on a parabola obtained by projecting the reference parabola onto the horizontal plane, and passing through the reflecting point by a vertical plane including that ray vector and parallel with the vertical axis.

That is, the imaginary paraboloid of revolution has a focus at the reference point that deviates from the focus of the reference parabola by a certain distance, has an axis in parallel with the ray vector of the ray (assumed to be emitted from the reference point (focus)) reflected at the reflecting point on the orthogonal projection of the reference parabola onto the horizontal plane, and includes the reflecting point. The vertical plane passes through the reflecting point, includes the ray vector of the reflected ray, and is in parallel with the vertical axis. A collection of the intersecting lines of the imaginary paraboloids of revolution and the imaginary planes constitutes the fundamental surface.

Under the condition that an arc of a discharge lamp is disposed generally along the optical axis, the first reflecting sector located above the horizontal plane including the optical axis has a paraboloid of revolution shape.

The second reflecting sector located at the right and left sides of the vertical plane including the optical axis has a shape of the above-described fundamental surface. The focus position of the reference parabola is identical to that of the first reflecting sector, and the distance between that focus and the reference point is longer than the orthogonal projection of the arc onto the optical axis.

The third reflecting sector located below the horizontal plane including-the optical axis has a paraboloid of revolution shape. The focal length of the third reflecting sector is greater than that of the first reflecting sector, and the focus position of the third reflecting sector is identical to the reference point of the second reflecting sector.

The arc projection pattern on a screen by each of the first and third reflecting sectors according to the invention is a generally fan-shaped pattern located under the horizontal plane because of the spatial relationship between the arc and the focus of the reflecting sector. In the case of the second reflecting sector, since the arc is disposed between the focus of the reference parabola and the reference point deviating therefrom toward the front side and generally along the optical axis passing through these two points, projection images of the arc on the distant screen due to arbitrary points on the intersecting line of the imaginary paraboloid of revolution and the imaginary plane, which are assumed for each point on the orthogonal projection of the reference parabola onto the horizontal plane, are located under the horizontal line with a point on an inclined line corresponding to the plane including the reference parabola as a rotation center.

Although glare caused by a sediment accumulated on the bottom of an arc forming space appears in areas close to the upper edge of the projection pattern, its influence can be suppressed by locating those areas under the horizontal line.

DESCRIPTION OF THE PREFERRED EMBODIMENT

Details of a reflector for a vehicular headlight according to an embodiment of the present invention is described hereinafter with reference to the accompanying drawings.

Figure 1:
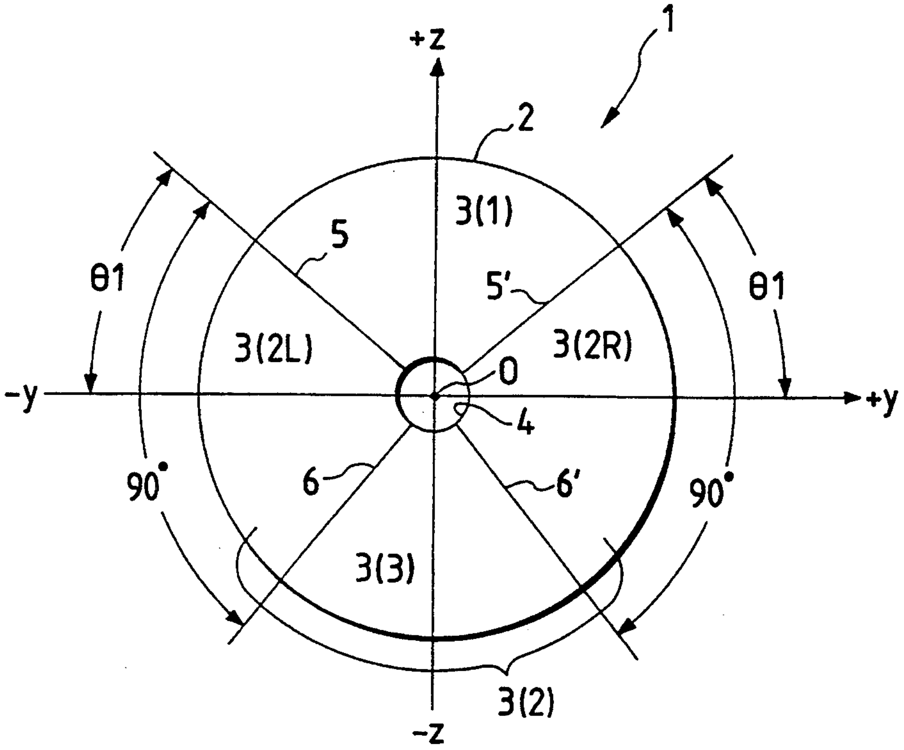
FIG. 1 is a front view showing constitution of a reflecting surface according to the present invention.

FIG. 1 is a front view of a reflector 1. Its reflecting surface 2 consists of three reflecting sectors 3(1), 3(2) and 3(3).

The coordinate system for the reflecting surface 2 is defined as follows. The optical axis (extending perpendicularly to the paper surface of FIG. 1) of the reflecting surface 2 is selected as the x-axis. The axis perpendicular to the x-axis and extending in the horizontal direction is selected as the y-axis (the right-hand side of FIG. 1 is the positive side). The axis perpendicular to the x-axis and extending in the vertical direction is selected as the z-axis (the upper half of FIG. 1 is the positive half). The origin O of the orthogonal coordinate system is located at the center of a bulb fixing hole 4 when viewed from the front side.

The reflecting sector 3(1) is a fan-shaped sector having a predetermined central angle and bridging the first and second quadrants of the yz-plane (when projected thereon), and is a part of a paraboloid of revolution.

The reflecting sector 3(2) consists of two fan-shaped sub-sectors 3(2L) and 3(2R) which are located on the left-hand side ($y<0$) and the right-hand side ($y>0$) of the xz-plane, respectively. In this embodiment, the central angles of the sub-sectors 3(2L) and 3(2R) are set at 90°. The sub-sectors 3(2L) and 3(2R) are smoothly connected to the sector 3(1) at boundary lines 5 and 5', each of which forms an angle $\theta 1$ with the xy-plane.

The reflecting sector 3(3), which bridges the third and fourth quadrants of the yz-plane (when projected thereon), is a fan-shaped sector having a central angle $2 \cdot \theta 1$ and is a part of a paraboloid of revolution. The focal length of the reflecting sector 3(3) is greater than that of the reflecting sector 3(1). The reflecting sector 3(3) is smoothly connected to the sub-sectors 3(2L) and 3(2R) at boundaries 6 and 6'.

The fundamental surface of the sub-sectors 3(2L) and 3(2R) is disclosed in U.S. patent application Ser. No. 07/808,670 filed by the present applicant, and is summarized below.

Figure 3:
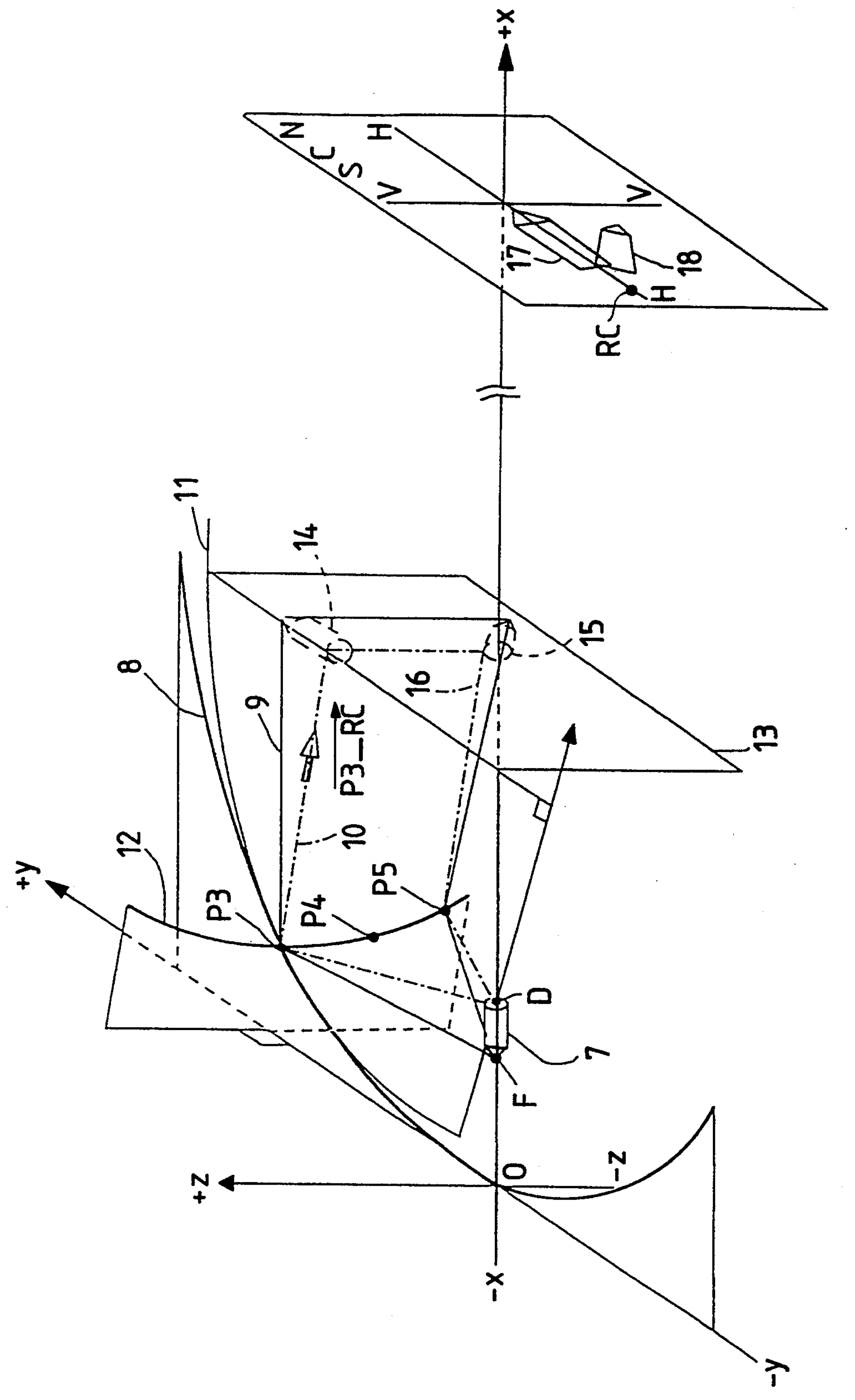
FIG. 3 is a light path diagram with a fundamental surface of the invention.

As shown in FIG. 3, a filament 7 is disposed between point F (hereinafter called a "first focus") and point D (hereinafter called a "second focus"), with its central axis along the x-axis. Point D is deviated from point F by a distance d in the positive direction of the x-axis.

To clarify the orientation of the filament 7, an assumption "the filament 7 has a pencil-like form with its one tip on the side of point F having a cone-like pointed shape and the other tip on the side of point D being flat" is employed just for convenience of description.

First, a parabola 8 having a focus at point F is assumed on the xy-plane.

After being emitted from point F (near the rear end of the filament 7) and then reflected at point P3 on the parabola 8, a ray 9 travels in parallel with the optical axis (i.e., x-axis). On the other hand, after being emitted from point D (near the front end of the filament 7) and then reflected at point P3, a ray 10 travels toward point RC on a screen SCN far from the reflector 1 and crosses the optical axis. That is, the ray 10 has a vector P3_RC as its direction vector.

Now, another parabola 11 is assumed which has a focus at point D and an axis extending along the vector P3_RC. As shown in FIG. 3, the parabola 11 crosses the parabola 8 at point P3.

A paraboloid of revolution is obtained by rotating the parabola 11 about its axis, and a parabola 12 is defined as a parabola obtained by cutting this paraboloid of revolution by a plane including the vector P3_RC and perpendicular to the xy-plane.

A curved surface is generated as a collection of the parabolas 12 obtained as point P3 is moved along the parabola 8.

Filament images are projected onto a plane 13 in the following manner in the midst of traveling of rays toward the screen SCN. Am image 14 due to point P3 is in parallel with the horizontal line. An image 15 due to point P5 that is on the parabola 12 and lower than point P3 forms a certain angle with the horizontal line. The path taken by a ray 16 after being reflected at point P5 is in parallel with the path taken by the ray 10 after being reflected at point P3 (both of the rays 10 and 16 are emitted from point D).

Since the intersecting line is defined so that the rays relating to the formation of the flat ends of the filament images 14 and 15 become in parallel with each other, filament images 17 and 18 are formed on the screen SCN with point RC as their rotation center (the above parallel rays substantially coincide with each other at point RC).

Figure 4:
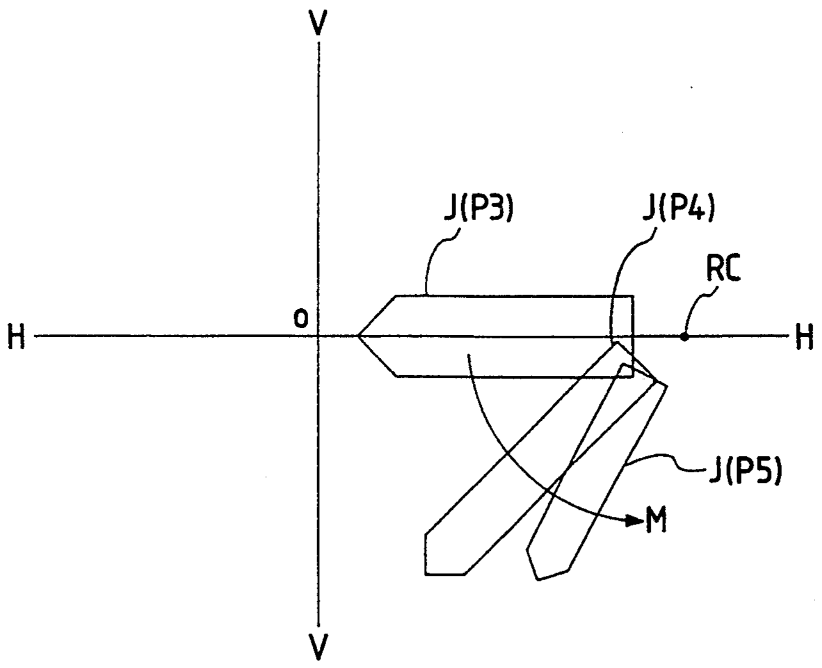
FIG. 4 shows an arrangement of filament images produced by the fundamental surface of the invention.

FIG. 4 schematically shows an arrangement of the filament images due to points P3 and P5, and point P4 that is on the parabola 12 and located between points P3 and P5.

In FIG. 4, J(X) indicates a filament image corresponding to each representative point X. Filament images J(P3), J(P4) and J(P5) due to points P3, P4 and P5 are arranged with point RC on the horizontal line H—H as their rotation center. That is, as indicated by arrow M, the filament image rotates counterclockwise about point RC as the reflection point goes down (P3→P4→P5). The filament images are located under the horizontal line H—H while their flat ends are always directed to point RC.

Figure 5:
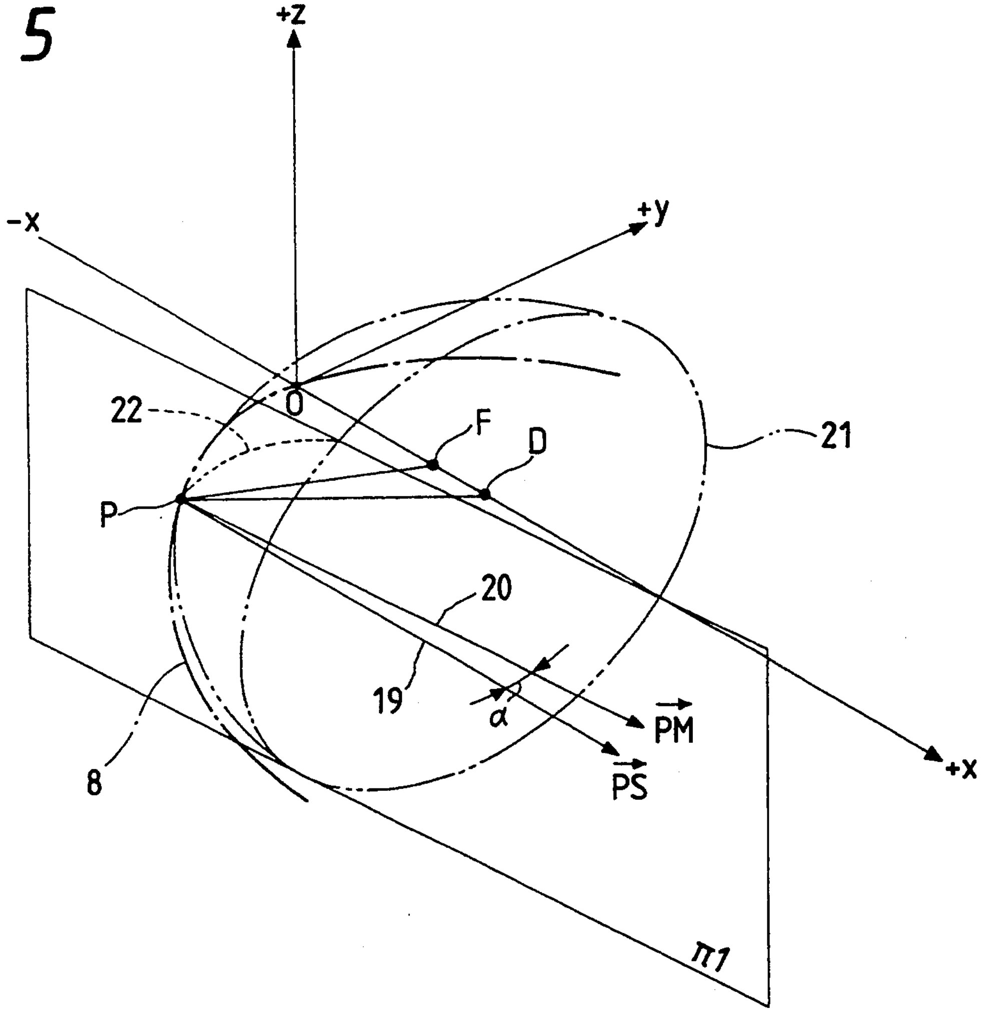
FIG. 5 is a perspective view schematically illustrating formation of the fundamental surface of the invention.

FIG. 5 shows how the reflecting surface 2 is generated. In FIG. 5, point P is an arbitrary point located on the parabola 8 that is included in the xy-plane. (By introducing a parameter q, coordinates of point P are expressed as $(q^2/f, -2q, 0)$.) After being emitted from point F and then reflected at point P, a ray 19 travels in parallel with the x-axis as indicated by a vector PS.

On the other hand, after being emitted from point D and then reflected at point P with a reflection angle smaller than that of the ray 19 according to the law of reflection, a ray 20 travels straight (indicated by a vector PM) forming a certain angle $\alpha$ with the ray 19.

Now, an imaginary paraboloid of revolution 21 (indicated by a two-dot chain line) is assumed which passes through point P and has an axis extending in the parallel with the ray vector PM. A cross-sectional curve is obtained by cutting the paraboloid of revolution 21 by a vertical plane $\pi 1$ including the ray vector PM and parallel with the z-axis. (An intersecting line 22 of the paraboloid of revolution 21 and the plane $\pi 1$.)

It is apparent that the above cross-sectional curve (indicated by a dashed line) is a parabola. The fact that rays emitted from point D and then reflected at arbitrary points on the intersecting line 22 travel in parallel with each other conform to the situation described in connection with FIG. 3.

In this manner, the fundamental reflecting surface is obtained as a collection of intersecting lines of the imaginary paraboloids of revolution corresponding to points P on the parabola 8 and the planes including the respective axes of the imaginary paraboloids of revolution and parallel with the z-axis.

This curved surface is expressed by Eq. 1 with the use of parameters shown in Table 1.

TABLE 1

| Parameter | Definition |
|---|---|
| f | Focal length of parabola 8 ($\overline{OF}$) |
| d | Interval between points F and D ($\overline{FD}$) |
| q | Specifying a point on parabola 8 |
| h | Height in z-direction from plane z = 0 |

TABLE 1-continued

| Q | $= (f^2 + q^2)/f$ |
|---|---|

$$x = \frac{(Q-f)\left[1 + \frac{2d(Q-f)}{Q^2 + (2f-Q)d}\right] + \frac{h^2}{4f(1 + d/Q)}}{1 + \frac{2d(Q-f)}{Q^2 + (2f-Q)d}} \quad (1)$$

$$y = 2q\left[\frac{d(x - Q + f)}{Q^2 + (2f-Q)d} - 1\right]$$

$$z = h$$

$$\text{where } Q = \frac{f^2 + q^2}{f}$$

The process of deriving Eq. 1 is not described here because doing so may unduly complicate the description of the invention. But it is noted that Eq. 1 can be obtained based on only the above description and knowledge of elementary algebraic geometry. Further, it is understood that Eq. 1 also expresses paraboloids of revolution as a special case of d=0.

Equation 1 is generalized into Eq. 2 in which a parabola on a plane inclined from the xy-plane by an angle $\theta$ is employed instead of the parabola 8.

$$x = x(q,h,f,d,\theta) = \quad (2)$$

$$\frac{(Q-f)\left[\frac{d}{Q} + \cos^2\theta\left(1 - \frac{d}{Q} + \frac{2d(Q-f)}{Q^2 + (2f-Q)d}\right)\right] + \frac{h^2}{4f(1 + d/Q)}}{1 + \frac{2d(Q-f)\cos^2\theta}{Q^2 + (2f-Q)d}}$$

$$y = y(q,f,d,\theta) = 2q\cos\theta\left[\frac{d(x - Q + f)}{Q^2 + (2f-Q)d} - 1\right]$$

$$z = z(h) = h$$

$$\text{where } Q = \frac{f^2 + q^2}{f}$$

By substituting $\theta=0$ into Eq. 2, it is easily verified that Eq. 2 includes Eq. 1.

While the above description is made of the case where the filament is employed as the light source, in order to apply the above equations to the reflector under consideration the parameters for the reflecting surface 2 need to be modified so as to conform to the arc shape.

Figure 2:
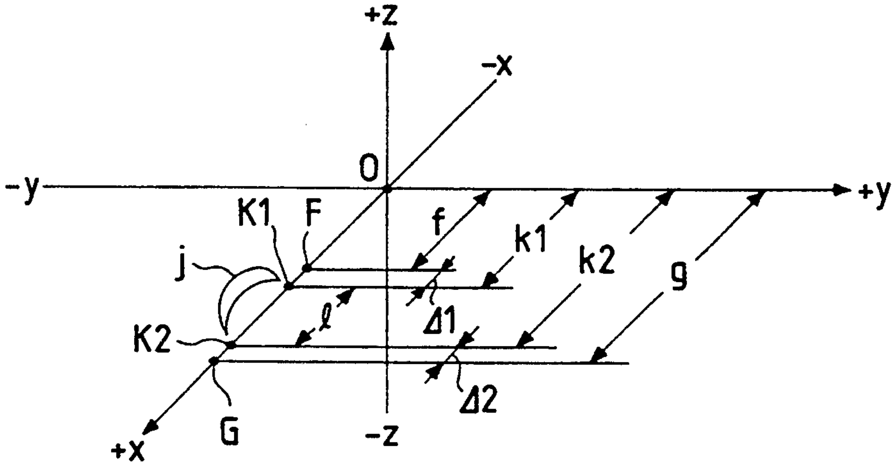
FIG. 2 illustrates a relationship between an arc and the optical axis.

FIG. 2 shows a relationship between the arc j and the optical axis. In FIG. 2, F and G denote foci of focal lengths f and g (>f) on the x-axis, respectively. The arc j exists just over (generally along) the x-axis, and its orthogonal projection onto the x-axis is located between points F and G and has a length 1.

Point K1 on the x-axis (distant from the origin O by k1) indicates a rear end of the orthogonal projection onto the x-axis of the arc j, and point K2 on the x-axis (distant from the origin O by k2) indicates a front end of the orthogonal projection of the arc j.

The reflecting sector 3(1) is a part of the paraboloid of revolution that has the focus F, and is expressed by equations obtained by substituting d=0 (which means that both of the first and second foci are located at point F) into Eq. 2.

The reflecting sector 3(2), which has the first focus at point F and the second focus at point G, is expressed by substituting $d=g-f$ and $\theta=-\theta 1$ ($\theta 1>0$) into Eq. 2.

Character d denotes the distance between points F and G, which is the length 1 of the orthogonal projection of the arc j onto the x-axis plus a certain margin. That is, with definitions $\Delta 2=g-k2$ and $\Delta 1=k1-f$, $d=(k2+\Delta 2)-(k1-\Delta 1)=1+(\Delta 1+\Delta 2)$ where $1=k2-k1$.

The reflecting sector 3(3) is a part of the paraboloid of revolution that has the focus G, and is expressed by equations obtained by substituting $d=0$ into Eq. 2.

Table 2 shows the definitions of the above parameters.

TABLE 2

| Sector | Distance from origin to 1st focus | Distance from 1st focus to 2nd focus | Angular parameter $\theta$ |
|---|---|---|---|
| 3(1) | f | 0 | 0 |
| 3(2) | f | $1 + \Delta 1 + \Delta 2$ | $-\theta 1$ |
| 3(3) | g | 0 | 0 |

In Table 2, the parameter $\theta$ is set at 0 for the reflecting sectors 3(1) and 3(3). But this is done just for convenience of description, because the equations for the paraboloid of revolution is obtained when $\theta$ is eliminated by substituting $d=0$ into Eq. 2.

When the arc j has a length 1 of 6 mm, the parameters may have the following specific values: $f=24$ mm, $g=32$ mm, $k1=25$ mm, and $k2=31$ mm. In this example, the margins $\Delta 1$ and $\Delta 2$ are set at 1 mm.

FIGS. 6–9 schematically show projection patterns 23(1)–23(3) produced by the respective reflecting sectors 3(1)–3(3). In FIGS. 6–9, H—H and V—V denote horizontal and vertical lines, and o denotes the intersection of those lines.

Figure 6:
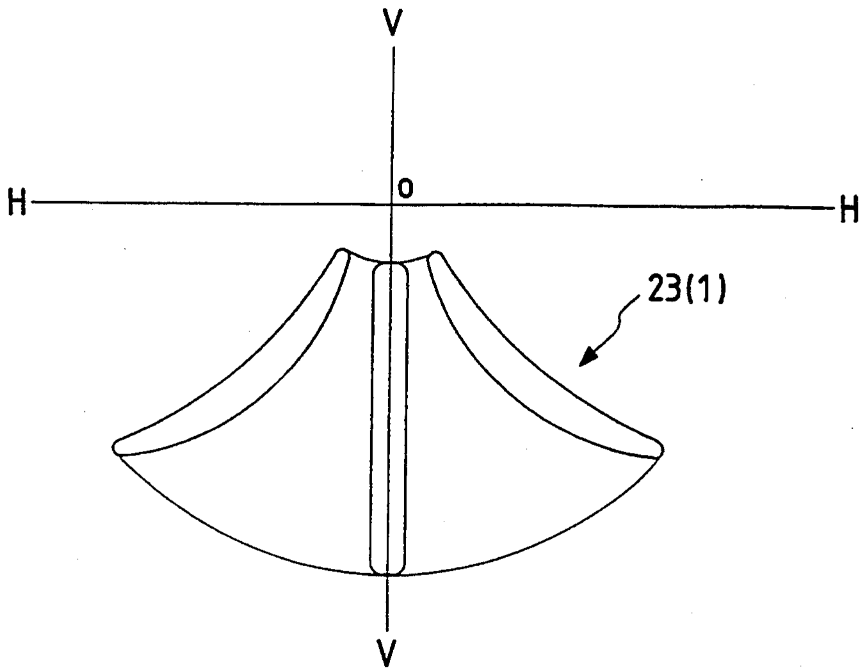
FIG. 6 schematically shows a projection pattern by a reflecting sector 3(1)

FIG. 6 shows the projection pattern 23(1) by the reflecting sector 3(1), which is a fan-shaped pattern having point o as its center because the reflecting sector 3(1) is a part of a paraboloid of revolution. More specifically, the projection pattern 23(1) is located under the horizontal line H—H and symmetrical with respect to the vertical line V—V. Projection images of the arc j are arranged radially around point o, to collectively form a central angle corresponding to that of the reflecting sector 3(1).

Figure 7:
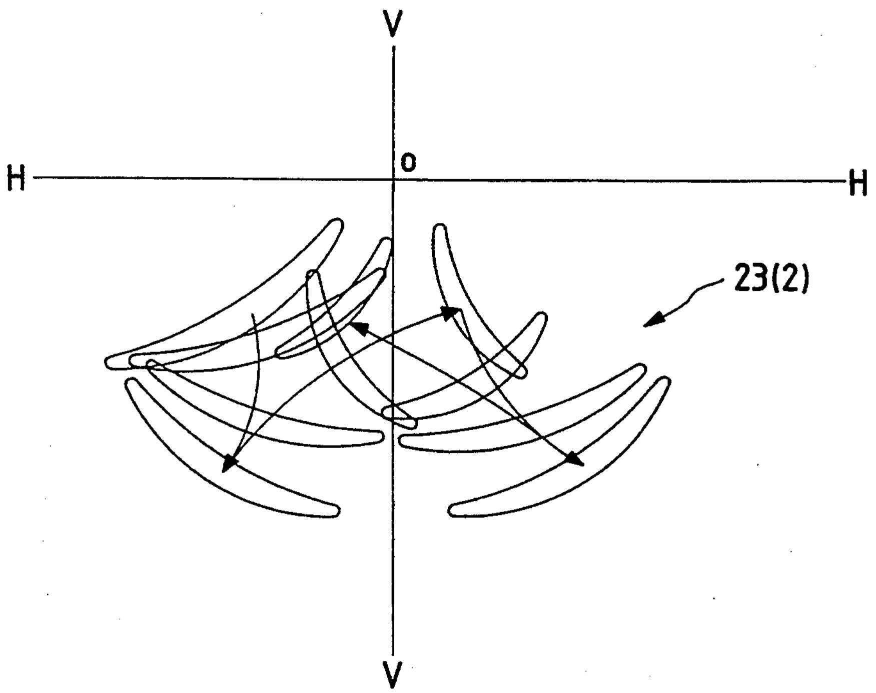
FIG. 7 schematically shows a projection pattern by a reflecting sector 3(2)

FIG. 7 shows the projection pattern 23(2) by the reflecting sector 3(2), which is located under the horizontal line H—H. Since the sub-sectors 3(2L) and 3(2R) have the reference plane that is inclined from the xy-plane by the angle $\theta 1$, projection images of the arc j by those sub-sectors has their rotation center on an axis inclined downward from the horizontal line H—H. Arrows in FIG. 7 indicate movements of the projection images.

Figure 8:
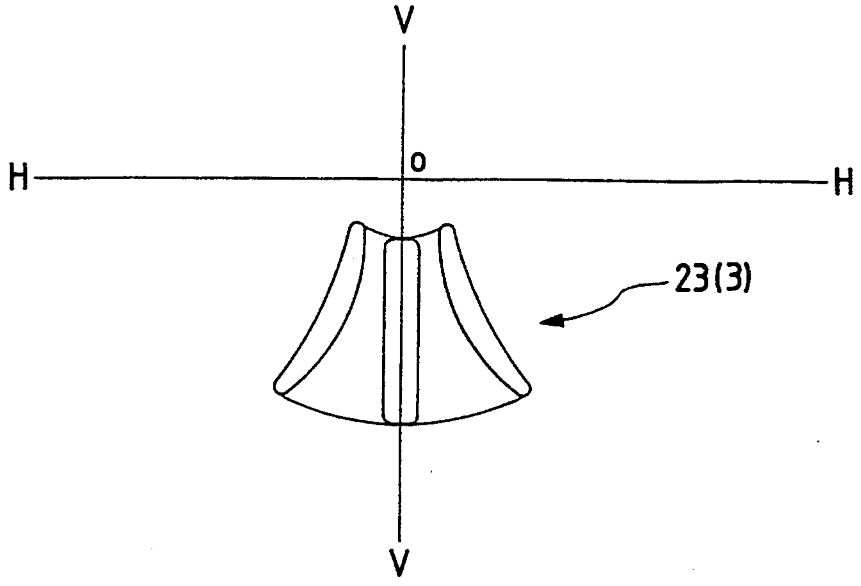
FIG. 8 schematically shows a projection pattern by a reflecting sector 3(3)

FIG. 8 shows the projection patterns 23(3) by the reflecting sector 3(3), which is a fan-shaped pattern having point o as its center because the reflecting sector 3(3) is a part of a paraboloid of revolution. More specifically, the projection pattern 23(3) is located under the horizontal line H—H and symmetrical with respect to the vertical line V—V. Projection images of the arc j are arranged radially around point o, to collectively form a central angle corresponding to that of the reflecting sector 3(3). It is noted that the focus G of the reflecting sector 3(3) is located on the front side of the arc j.

Figure 9:
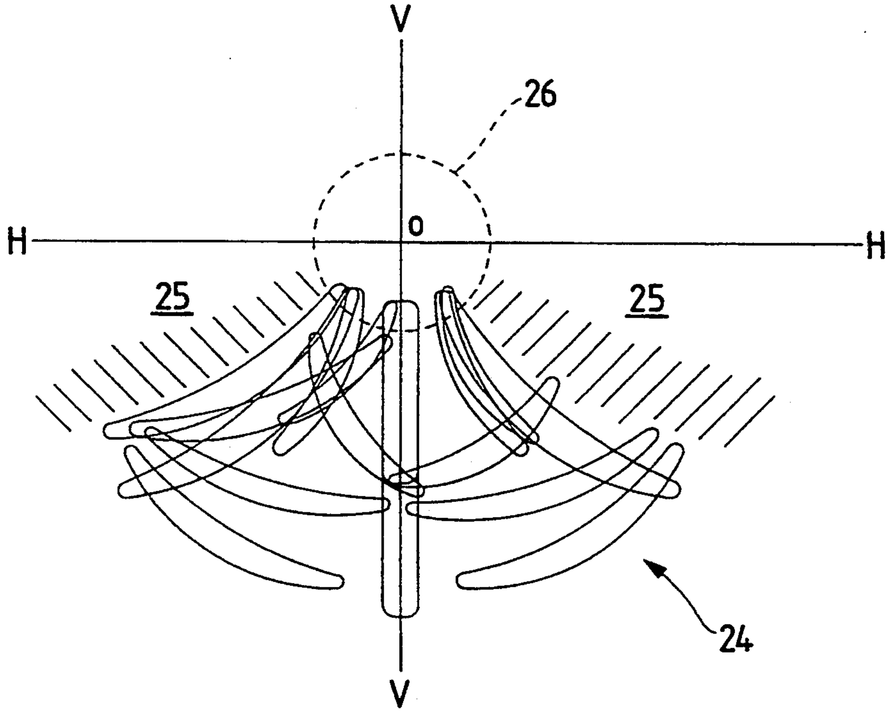
FIG. 9 schematically shows a combined projection pattern by the reflecting sectors 3(1)–3(3)

FIG. 9 schematically shows a combined pattern 24 of the projection patterns produced by the respective sectors 3(1)–3(3) of the reflecting surface 2.

Figure 17:
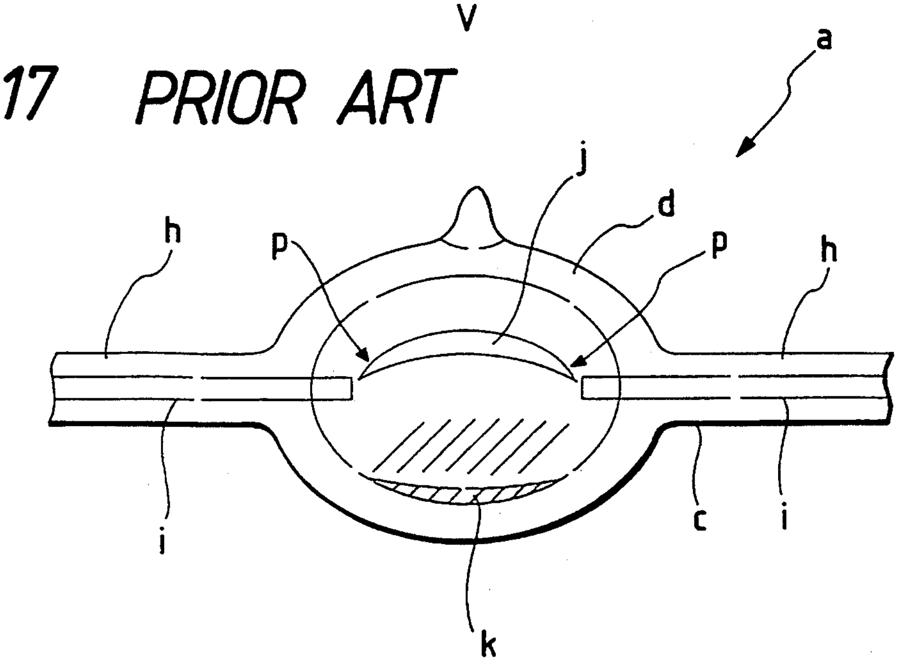
FIG. 17 PRIOR ART
FIG. 17 is an enlarged side view showing the main part of the metal halide lamp.

As described above with reference to FIG. 17, the glare is caused by the accumulation k of metal iodide substances in the sphere d. As shown in FIG. 9, the glare appears in areas 25 (hatched in FIG. 9) located immediately over the right and left upper edges of the projection pattern 24. The influence of the glare on the light distribution-pattern can be suppressed since the areas 25 are located under the horizontal line H—H.

The arc j has the maximum brightness at positions p, (see FIG. 17) close to the electrodes. Therefore, high-brightness portions of the respective projection images are gathered in an area 26 (indicated by a dashed line in FIG. 9) in the vicinity of point o to make the area 26 bright, that is, contribute to formation of high central brightness of the light distribution pattern.

It may be the case that in the projection pattern 23(3) by the reflecting sector 3(3), the projection patterns of the arc j are distorted due to the influence of metal iodide substances remaining in the sphere d. In such a case, it is proper that the focal length f be made greater to lower the projection pattern 23(3) in its entirety.

The projection pattern 24 is the basis of the light distribution pattern to be obtained finally, and it is necessary to horizontally diffuse the pattern 24 and form the cutline by certain measures.

One method is to form lens steps having diffusive action on an outer lens disposed in front of the reflector 1. However, it becomes difficult to form lens steps having strong horizontal diffusive action as the inclination of the outer lens is increased. In such a case, it is necessary to shift the diffusive action to the reflector.

The present invention employs a method of diffusing light only by the reflector 1 by smoothly undulating the reflecting surface 2. More specifically, a set of equations representing a wave-like pattern are combined with the above-described equations representing the reflecting surface 2.

The following function is introduced for that purpose:

$$Aten(s,W) = \exp\left[-\left(\frac{2s}{W}\right)^2\right] \tag{3}$$

Figure 10:
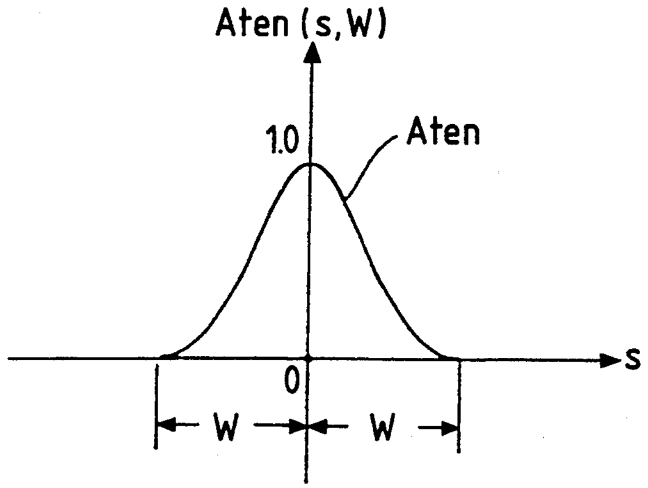
FIG. 10 is a graph showing a normal distribution type function Aten(s, W)

In the normal distribution type (or Gaussian) function Aten(s, W) using parameters s and W, the parameter W specifies the degree of attenuation. FIG. 10 shows the shape of the function Aten(s, W).

Further, a periodic function WAVE(s, λ) using a parameter λ is introduced:

$$\mathrm{WAVE}(s,\lambda) = \frac{1-\cos\left(360^\circ\cdot\frac{s}{\lambda}\right)}{2} \tag{4}$$

Figure 11:
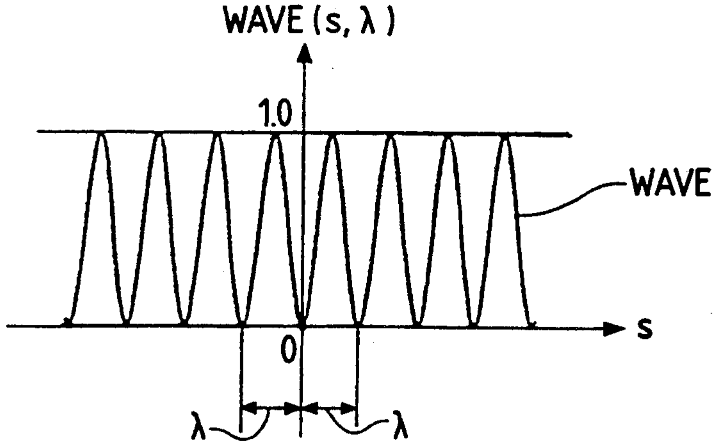
FIG. 11 is a graph showing a periodic function WAVE(s, λ)

The parameter λ specifies the wavelength, i.e., pitch of the cosine wave. FIG. 11 shows the shape of the function WAVE(s, W). While in this embodiment the cosine function is employed as the periodic function, other various periodic functions may be used when necessary.

Figure 12:
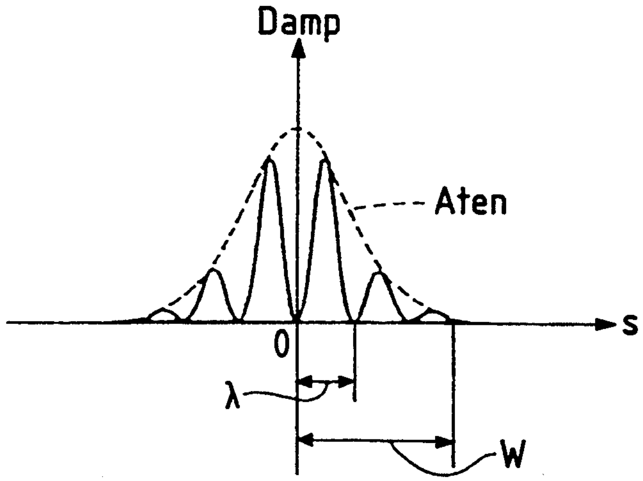
FIG. 12 is a graph showing a damped periodic function Damp(s, λ)

A damped periodic function Damp shown in FIG. 12 is obtained as a product of the above two kinds of functions. The reflecting surface 2 can be undulated by applying to it a function produced from the basic function Damp.

Figure 13:
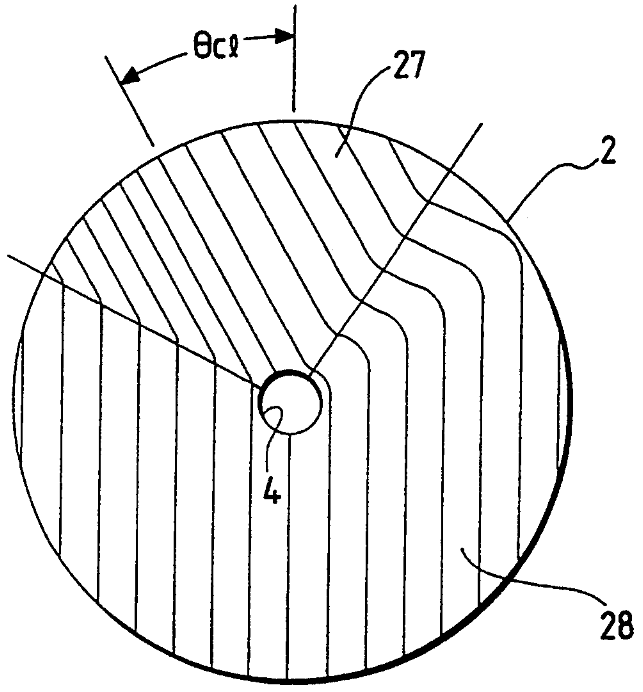
FIG. 13 is a front view schematically showing an example of undulations applied to the reflecting surface.

FIG. 13 shows an example of undulations applied to the reflecting surface 2. In FIG. 13, among protrusions and dents formed on the reflecting surface 2, the protrusions are indicated by lines.

As shown in FIG. 13, designing is performed so that the above lines (whose direction is hereinafter called an "undulation forming direction") are inclined from the vertical direction by $\theta_{cl}$ (corresponding to the cutline angle) in an upper fan-shaped region 27 and are along the vertical direction in the remaining region 28, and that the undulations are smoothly connected to each other at the boundaries between the two areas 27 and 28. As a result, the region 27 contributes to the formation of the cutline that is inclined from the horizontal line H—H, and the region 28 produces the horizontal diffusion in the light distribution pattern.

Since the high-brightness area 26 can be placed under the horizontal line H—H as shown in FIG. 9, a clear cutline can be formed when the basic pattern of FIG. 9 is modified by the diffusion.

Figure 14:
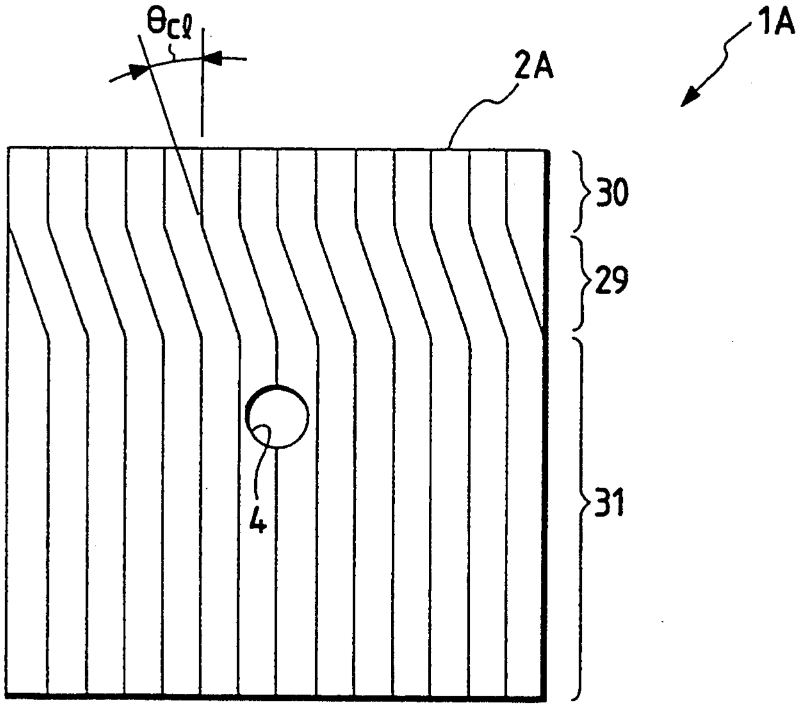
FIG. 14 is a front view schematically showing another example of undulations applied to the reflecting surface.
Figure 15:
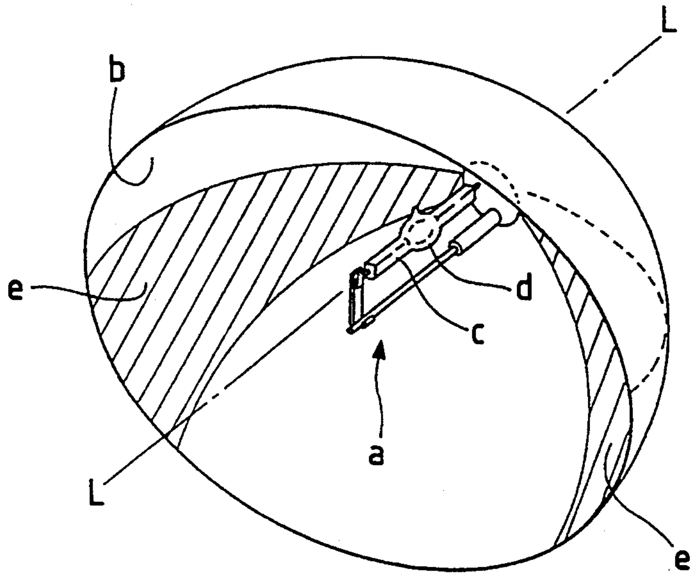
FIG. 15 PRIOR ART
FIG. 15 is a perspective view showing a conventional reflector with a metal halide lamp.
Figure 16:
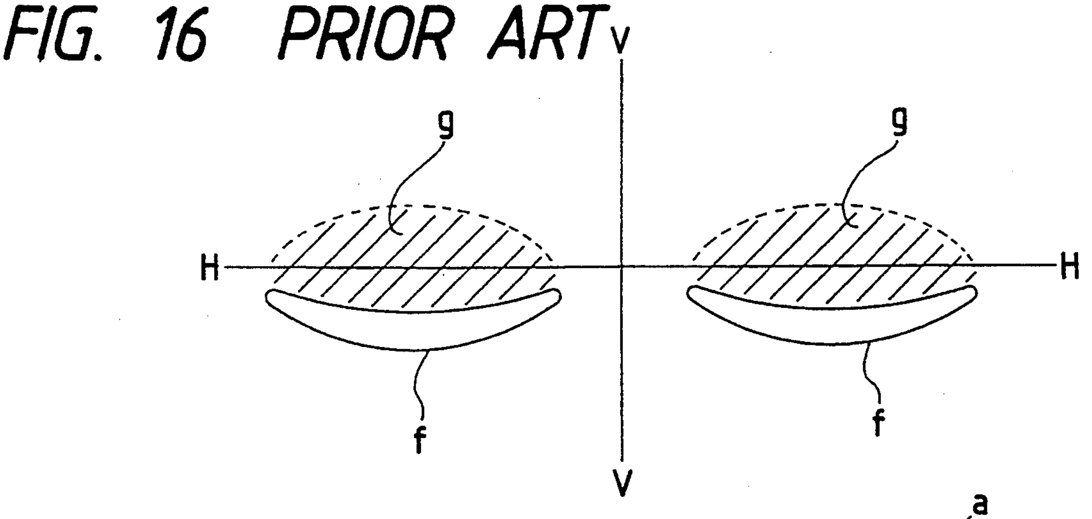
FIG. 16 PRIOR ART
FIG. 16 illustrates a problem of the conventional reflector.

The reflecting surface may be undulated in various manners. For example, in the case of a reflector 1A that is square when viewed from the front side (see FIG. 14), a region 29 having diffusive action of an angle $\theta_{cl}$ may be provided in a band-like part of the upper half of a reflecting surface 2A and the remaining regions 30 and 31 may be given horizontally diffusive action.

That is, designing is performed so that the lines indicating the protrusions (or dents), i.e., the undulation forming direction is inclined from the vertical direction by $\theta_{cl}$ in the region 29, and is along the vertical direction in the regions 30 and 31 that are located over and under the region 29. Further, the reflecting surface 2A is subjected to rounding at the boundaries between the region 29 and the regions 30 and 31 so that the undulations are smoothly connected to each other.

As described above, according to the invention, the reflecting surface consists of the three reflecting sectors around the optical axis. The reflecting surface is designed so that the projection patterns produced by the first and third reflecting sectors, which are respectively disposed above and below the horizontal plane including the optical axis, are located under the horizontal line, and that the projection pattern produced by the second reflecting sector disposed on the right and left sides of the vertical plane including the optical axis are also located under the horizontal line. Since the glare appearing close to the upper edge of the projection patterns can be confined so as not to cross the horizontal line, the glare appearing in the light distribution pattern over the cutline and the maximum contrast portion can be reduced.

The portions of the projection images corresponding to the maximum brightness portion of the arc can be gathered in the central area of the light distribution pattern. Therefore, when a projection pattern conforming to the standard is produced by applying the horizontal diffusion and the diffusion in the direction corresponding to the cutline forming direction to the basic pattern obtained by the reflector, it is possible to satisfy both of the clear cutline and the high central brightness.

The function which is a product of the normal distribution type function and the periodic function is applied to the equations representing the reflecting surface, to produce the undulatory reflecting surface. The undulation forming direction is inclined from the vertical direction in the region of the reflecting surface located above the horizontal plane including the optical axis, and is made in parallel with the vertical direction in the remaining region. As a result, it becomes possible to reduce the dependence on the outer lens in the light distribution control, to thereby design reflectors suitable for the slanted body shape.

What is claimed is:

1. A vehicular headlight for forming a low beam, comprising:

a reflecting surface having first, second and third reflecting sectors arranged around an optical axis of the reflecting surface, and a discharge lamp producing light in the form of an arc disposed generally along the optical axis of the reflecting surface, wherein:

the first reflecting sector is part of a paraboloid revolution having a focus at a first point, and the first reflecting sector is located above a horizontal plane including the optical axis, the second reflecting sector is defined with reference to:

a reference parabola which has a focus at a second point at the same position as the first point and which is included in a plane inclined from the horizontal plane by a predetermined angle, a reference point located on the optical axis on a front side of the second point, a parabola which is an orthogonal projection of the reference parabola onto the horizontal plane, and a set of paraboloids of revolution, each of the paraboloids of revolution of the set having an axis which extends parallel to ray vector direction taken by a reflected ray after being emitted from the reference point and then reflected at a respective reflecting point on the parabola which is an orthogonal projection of the reference parabola, each of the paraboloids of revolution of the set having a focus at the reference point, and each of the paraboloids of revolution of the set passing through the respective reflecting point, and the second reflecting sector is defined by a collection of intersecting lines, each of the intersecting lines being obtained by cutting a respective one of the paraboloids of revolution of the set by a respective vertical plane including the ray vector direction parallel to the axis of the respective one of the paraboloids of revolution of the set, and the second reflecting sector comprises two subsectors located on right and left sides of a vertical plane including the optical axis, the third reflecting sector is a part of a paraboloid of revolution having a focus at the reference point of the second reflecting sector, the third reflecting sector is located below the horizontal plane, and the third reflecting sector has a focal length greater than that of the first reflecting sector, and an orthogonal projection of the arc of the discharge lamp onto the optical axis is shorter than a distance between the second focus and the reference point.

2. The vehicular headlight of claim 1, wherein boundaries between the first, second and third reflecting sectors are radial lines extending from the optical axis.

3. The vehicular headlight of claim 1, wherein the two sub-sectors of the second reflecting sector are located in areas symmetrical with respect to the vertical plane.

4. The vehicular headlight of claim 1, wherein said reflecting surface is additionally modulated by a function that is a product of a normal distribution type function and a periodic function to make the reflecting surface undulatory such that an undulation forming direction is inclined by a predetermined angle from a vertical direction in a region of the reflecting surface located above the horizontal plane and is in parallel with the vertical direction in the remaining region.

* * * * *